(12) United States Patent
Li et al.

(10) Patent No.: US 10,760,470 B2
(45) Date of Patent: Sep. 1, 2020

(54) SHIP PROPULSION APPARATUS

(71) Applicant: Guangdong ePropulsion Technology Limited, Dongguan (CN)

(72) Inventors: Guang Li, Dongguan (CN); Xiao-Kang Wan, Dongguan (CN); Shi-Zheng Tao, Dongguan (CN); Xue-Feng Tang, Dongguan (CN); Yi-Chi Zhang, Dongguan (CN)

(73) Assignee: Guangdong ePropulsion Technology Limited, Dongguan (CN)

( * ) Notice: Subject to any disclaimer, the term of this patent is extended or adjusted under 35 U.S.C. 154(b) by 0 days.

(21) Appl. No.: 16/394,407

(22) Filed: Apr. 25, 2019

(65) Prior Publication Data

US 2019/0249590 A1      Aug. 15, 2019

Related U.S. Application Data

(63) Continuation-in-part of application No. PCT/CN2017/097385, filed on Aug. 14, 2017.

(30) Foreign Application Priority Data

Oct. 26, 2016   (CN) .......................... 2016 1 0951486

(51) Int. Cl.
| B63H 21/17 | (2006.01) |
| F01P 3/20 | (2006.01) |
| B63H 21/38 | (2006.01) |
| B63J 2/12 | (2006.01) |
| B63H 23/24 | (2006.01) |

(52) U.S. Cl.
CPC .............. *F01P 3/202* (2013.01); *B63H 21/17* (2013.01); *B63H 21/383* (2013.01); *B63H 23/24* (2013.01); *B63J 2/12* (2013.01)

(58) Field of Classification Search
CPC ....... F01P 3/202; B63H 21/17; B63H 21/383; B63H 23/24
See application file for complete search history.

(56) References Cited

U.S. PATENT DOCUMENTS

| 4,764,135 A | 8/1988 | McCormick | |
| 6,634,913 B2 * | 10/2003 | Shibata | F01L 1/053 440/88 C |
| 7,581,517 B2 * | 9/2009 | Brown | F01P 3/207 123/41.09 |
| 10,059,416 B2 * | 8/2018 | Shomura | B63H 20/24 |
| 2002/0146946 A1 | 10/2002 | Shibata | |

(Continued)

FOREIGN PATENT DOCUMENTS

| CN | 101586564 A | 11/2009 |
| CN | 202172317 U | 3/2012 |

(Continued)

*Primary Examiner* — S. Joseph Morano
*Assistant Examiner* — Jovon E Hayes
(74) *Attorney, Agent, or Firm* — ScienBiziP, P.C.

(57) ABSTRACT

A closed-loop cooling ship propulsion apparatus includes a power device, a pump, and a coolant supply. A fluid circuit is formed in the ship propulsion apparatus and a coolant in the loop can be arranged to circulate through all heat-generating components in addition to the pump and motive power unit. A closed-loop circuit avoids the blockages and contamination which might occur if the water of a sea or lake was used directly.

20 Claims, 17 Drawing Sheets

(56) References Cited

U.S. PATENT DOCUMENTS

| | | | |
|---|---|---|---|
| 2005/0116553 A1 | 6/2005 | Poulin et al. | |
| 2015/0017033 A1* | 1/2015 | Sakkinen | B63J 2/12 |
| | | | 417/423.8 |
| 2015/0232163 A1 | 8/2015 | Hartmeyer et al. | |
| 2015/0295473 A1 | 10/2015 | Suzuki et al. | |
| 2019/0249590 A1* | 8/2019 | Li | B63H 21/17 |

FOREIGN PATENT DOCUMENTS

| | | |
|---|---|---|
| CN | 102431638 A | 5/2012 |
| CN | 104179951 A | 12/2014 |
| CN | 104369853 A | 2/2015 |
| CN | 105377693 A | 3/2016 |
| CN | 106516064 A | 3/2017 |
| CN | 106542073 A | 3/2017 |
| CN | 206117392 U | 4/2017 |
| JP | 4337522 B2 | 6/2005 |
| JP | 2005162055 A | 6/2005 |

\* cited by examiner

SHIP PROPULSION APPARATUS

FIELD

The subject matter herein generally relates to ship propulsion apparatus.

BACKGROUND

A ship propulsion apparatus or system is used in a powerboat, a rubber boat, a sailboat, or the like. The ship propulsion apparatus will employ an engine or an electric motor to be a power device. No matter which power device is employed by the ship propulsion apparatus, the power device or other component generates heat. If the heat is not discharged timely, the temperature of the power device or other element may increase, which may influence the performance. Overheating may cause permanent damage to the ship propulsion apparatus.

SUMMARY OF THE DISCLOSURE

The present disclosure provides a ship propulsion apparatus with a cooling structure.

A ship propulsion apparatus including a power device, a pump, and a coolant supply, forms a fluid circuit. The fluid circuit is configured to contain a coolant to circulate through the pump and the coolant supply.

In one embodiment, the fluid circuit is configured to contain the coolant to circulate through the power device.

In one embodiment, the power device drives the pump.

In one embodiment, the pump includes a pump driver.

In one embodiment, the pump includes a drive gear and a driven gear engaged with the drive gear. The fluid circuit is configured to contain the coolant to circulate through the drive gear and the driven gear.

In one embodiment, the pump communicates with the coolant supply in series.

In one embodiment, the ship propulsion apparatus further includes a supporting rod. The fluid circuit is configured to contain the coolant to circulate through the supporting rod.

In one embodiment, the supporting rod defines a supporting rod coolant passage which communicates with the pump in series.

In one embodiment, the supporting rod coolant passage extends along a longitudinal axis of the supporting rod.

In one embodiment, the supporting rod coolant passage is continuous at the end of the passage in the supporting rod away from the pump.

In one embodiment, the ship propulsion apparatus further includes a driver and a battery. The fluid circuit is configured to contain the coolant to circulate through the driver and the battery. The battery includes a built-in battery management system (BMS).

In one embodiment, the supporting rod coolant passage is formed in the supporting rod. The fluid circuit includes the supporting rod coolant passage.

In one embodiment, an end surface of the supporting rod defines two interconnected communication holes. The two interconnected communication holes communicate with the supporting rod coolant passage.

In one embodiment, the ship propulsion apparatus further includes a housing. The housing defines a receiving space to receive the supporting rod. The housing defines a number of water inlets communicating with the receiving space.

In one embodiment, the cross-section of the housing or the supporting rod is teardrop shape, streamlined shape, or circular.

In one embodiment, the pump includes a first end cover, a second end cover, and the drive gear and the driven gear received between the first end cover and the second end cover. The drive gear and the driven gear engage with each other. The fluid circuit is configured to contain a coolant to circulate through the drive gear and the driven gear.

In one embodiment, the pump defines two passageways. The two passageways each communicates with the supporting rod coolant passage in the supporting rod and one of the two passageways is formed through the drive gear and the driven gear. In one embodiment, the supporting rod coolant passage is continuous at the end of the passage in the supporting rod.

In one embodiment, the ship propulsion apparatus further includes the housing arranged at a side of the pump. The supporting rod coolant passage is arranged in the housing. The fluid circuit includes the supporting rod coolant passage.

In one embodiment, the pump includes a first end cover, a second end cover, and a drive gear and a driven gear received between the first end cover and the second end cover. The drive gear is engaged with the driven gear. The fluid circuit is configured to contain a coolant circulate through the drive gear and the driven gear.

In one embodiment, the power device includes a stator, a rotor cooperating with the stator, a heat sink, a first end cover, and a second end cover. The heat sink is arranged in the stator. The first end cover and the second end cover are arranged at two ends of the heat sink respectively. The heat sink defines a number of power device coolant passages. The first end cover defines a number of first communicating slots communicating with the power device coolant passages, and the second end cover defines a number of second communicating slots communicating with the power device coolant passages. The first end cover or the second end cover defines a fluid inlet and/or a fluid outlet. The fluid inlet and the fluid outlet both communicate with at least one power device coolant passage of the power device coolant passages.

In one embodiment, each power device coolant passage is straight or spiral.

In one embodiment, the first communicating slots and the second communicating slots have concavities.

In one embodiment, the stator 20 includes a magnetic core and a number of coils winding around the magnetic core. The heat sink is arranged in the magnetic core.

In one embodiment, a sealing pad or a sealing grease is arranged between the heat sink and the first end cover and/or the heat sink and the second end cover.

The above ship propulsion apparatus drives the coolant flowing in the fluid circuit to dissipate heat from the ship propulsion apparatus as the fluid circuit is arranged closed. Moreover, the ship propulsion apparatus being a closed circuit, external water is not required, contamination because of the external coolant supply and blockages because of the impurity of the external coolant supply are thus avoided. Thus, less maintenance of the ship propulsion apparatus is required, the cost for maintaining the ship propulsion apparatus reduces while the service life of the ship propulsion apparatus increases.

DETAILED DESCRIPTION

Clear and complete description will be made to technical schemes of the present disclosure in conjunction with corresponding drawings in the embodiment of the present disclosure. Obviously, the described embodiments are merely a part of the embodiments of the present disclosure and not all the embodiments. Based on the embodiments of the present disclosure, all other embodiments obtained by those ordinarily skilled in the art without paying creative work fall within the protection scope of the present disclosure.

When one component is considered to "couple" another component, it may be directly connected to the other component or it is possible that there is a third component between them.

Unless otherwise defined, all the technical and scientific terms used in this specification convey the same meanings as the meanings commonly understood by a person skilled in the art. Additionally, the terms used in the specification the present disclosure are merely for describing the objective of the specific embodiments, and are not intended to limit the present disclosure. The term "and/or," includes any and all combinations of one or more of the associated listed items.

Figure 1:
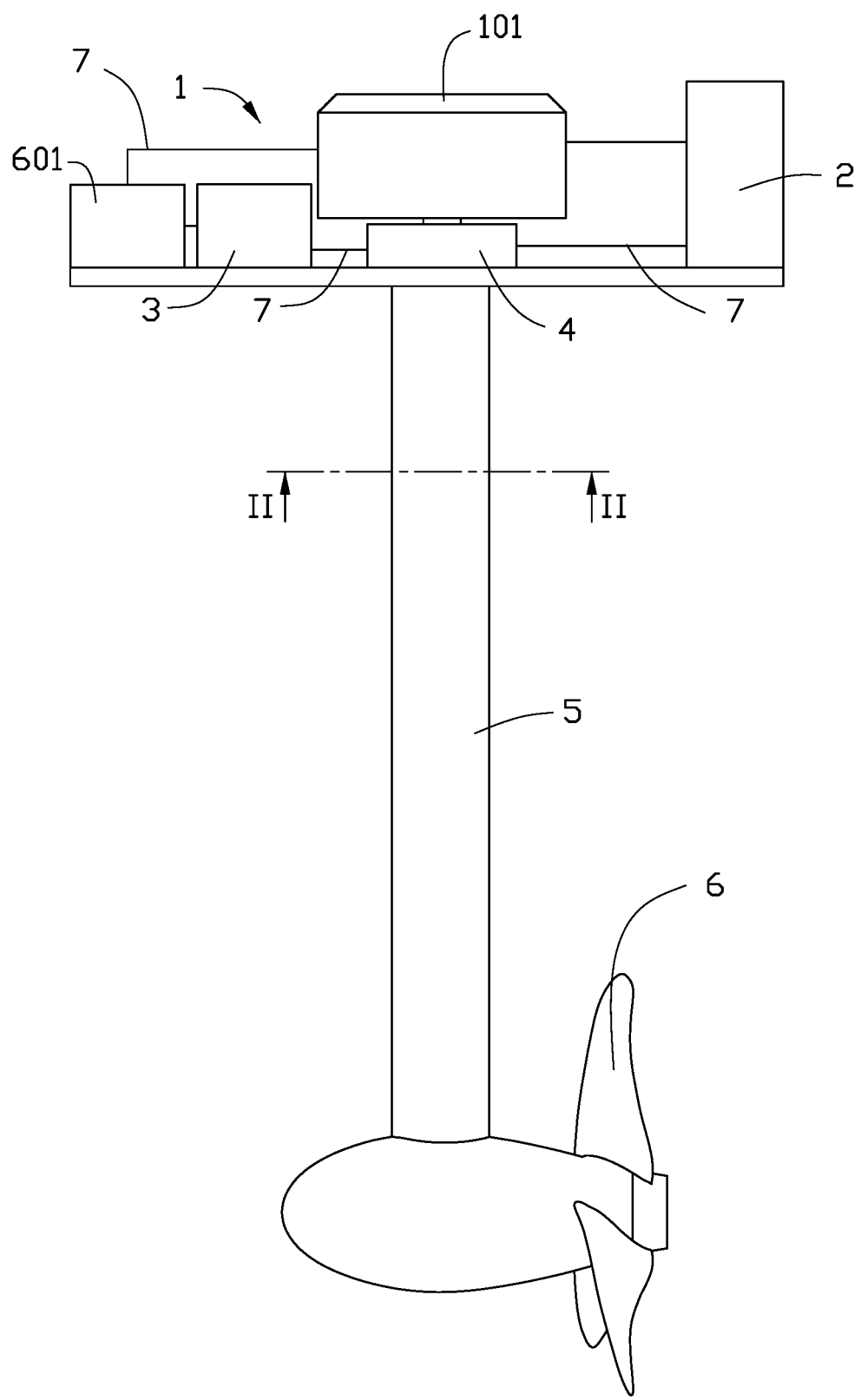
FIG. 1 is a schematic view of a first embodiment of a ship propulsion apparatus.
Figure 2:
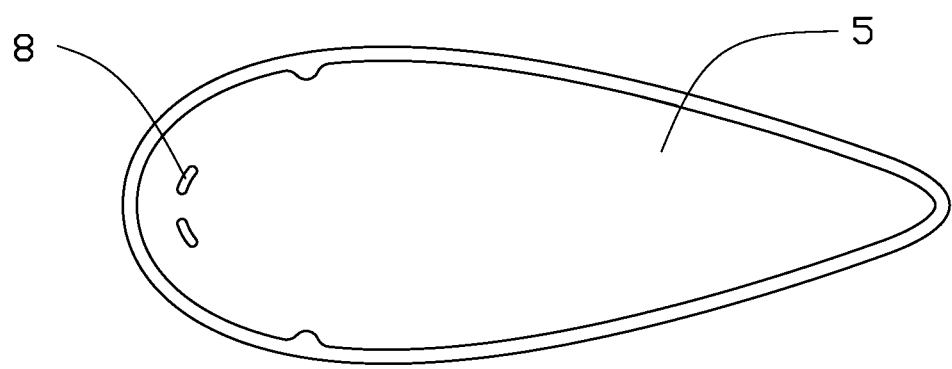
FIG. 2 is a cross-sectional view along line II-II of FIG. 1.
Figure 3:
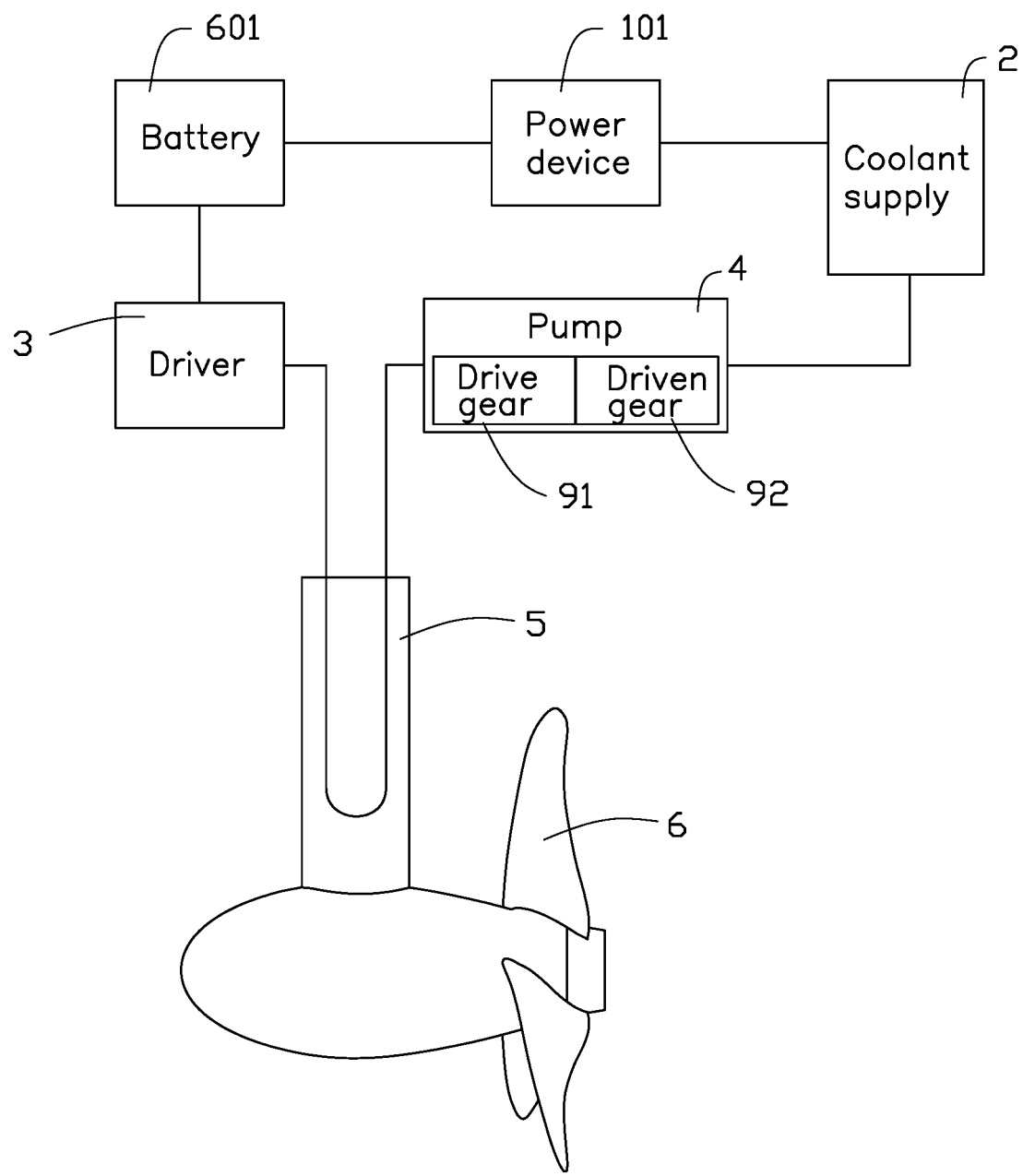
FIG. 3 is a plan view of the ship propulsion apparatus of FIG. 1.

A pump of a ship propulsion apparatus circulates coolant in a closed fluid circuit. Thus, the ship propulsion apparatus exchanges and dissipates heat to an external environment, and one or more components circulated through by the closed fluid circuit are cooled. Referring to FIG. 1 to FIG. 3, a first embodiment provides a ship propulsion apparatus 1. The ship propulsion apparatus 1 includes a power device 101, a coolant supply 2, a driver 3, a battery 601, a pump 4, a supporting rod 5, a propeller 6, and a number of water pipes 7. A fluid circuit for circulation of coolant in a closed loop is formed in the ship propulsion apparatus 1. The coolant in the fluid circuit is driven by the pump 4 to circulate. The coolant supply 2 provides coolant in the fluid circuit. The coolant is gas or liquid for cooling. In the embodiment, the coolant supply 2 is a water tank. The supporting rod 5 acts as a backbone or spine for supporting, the cross-section of the supporting rod 5 is teardrop shaped, streamlined shape, or circular. The power device 101, the driver 3, and the battery 601 are main components of the ship propulsion apparatus 1. The battery 601 includes a battery management system (BMS). The power device 101 is an electric motor, an engine, or the like. The pump 4 is a pump driven by the power device 101, or includes a pump driver. The pump 4 is a pump capable of forward and reversely working. Namely, the pump 4 is compatible with different power devices, such as the electric motor, the engine, or the like. When the pump 4 rotates in a forward direction or rotates in a reverse direction, the coolant circulates in a corresponding direction. When the pump 4 includes a pump driver, the pump can function independently after it is powered on and driven by the pump driver. The pump 4 is a gear pump. The pump 4 includes a drive gear 91 and a driven gear 92 engaged with the drive gear 91. The coolant in the fluid circuit circulates through the drive gear 91 and the driven gear 92. In other embodiments, the pump 4 is not limited to the gear pump. Some of the main components are not limited to the power device 101, the driver 3, and the battery 601 of the embodiment.

The coolant in the fluid circuit circulates through the components needing to be cooled, to bring heat therefrom. In the embodiment, the coolant supply 2 and the power device 101, the power device 101 and the battery 601, the battery 601 and the driver 3, the driver 3 and the pump 4, and the pump 4 and the coolant supply 2 communicate in series by water pipes 7. The pump 4 communicates with a supporting rod coolant passage in the supporting rod 5. In an alternative embodiment, the communication between each component is not limited to communication in series by water pipes, for example, when some components are not independent components, those components can communicate with each other via defining passages in the components. The coolant supply 2 is an independent component or is integrated with other components. In other embodiments, the component needing to be cooled, for example the driver, directly or indirectly, such as by other passages, communicates with the supporting rod coolant passage in the supporting rod 5. One passageway for circulation of coolant is formed in the pump 4.

In the embodiment, the coolant in the fluid circuit circulates through the driver 3, the power device 101, the battery 601, and the supporting rod 5. The supporting rod 5 defines the supporting rod coolant passage 8 as extending along a longitudinal axis of the supporting rod 5. The fluid circuit includes the supporting rod coolant passage 8. In the embodiment, the power device 101, the coolant supply 2, the battery 601, the pump 4, and the driver 3 communicate in series via water pipes 7, and the pump 4 communicates with the supporting rod coolant passage 8 in the supporting rod 5, thus a communication in series between each component is formed. When the ship propulsion apparatus 1 is working, the supporting rod 5 is partly immersed in water, the supporting rod coolant passage 8 in the supporting rod 5 is also partly immersed in water. The coolant in the supporting rod coolant passage 8 exchanges heat with the water of an external environment, such as a lake or a sea, thus the heat of the ship propulsion apparatus 1 is dissipated to the external environment. Such dissipation reduces the temperature of the coolant in the supporting rod coolant passage 8.

The coolant with reduced temperature circulates to other components of the fluid circuit, to cool the other components.

According to the different ship propulsion apparatuses or the different applications of the ship propulsion apparatus, different components are arranged to be cooled. The components needing to be cooled are not limited to the aforementioned power device 101, the aforementioned driver 3, and the aforementioned battery 601. The components needing to be cooled are, for example, the power device, the driver, the circuit board, the battery, or one or more electronic components.

Figure 4:
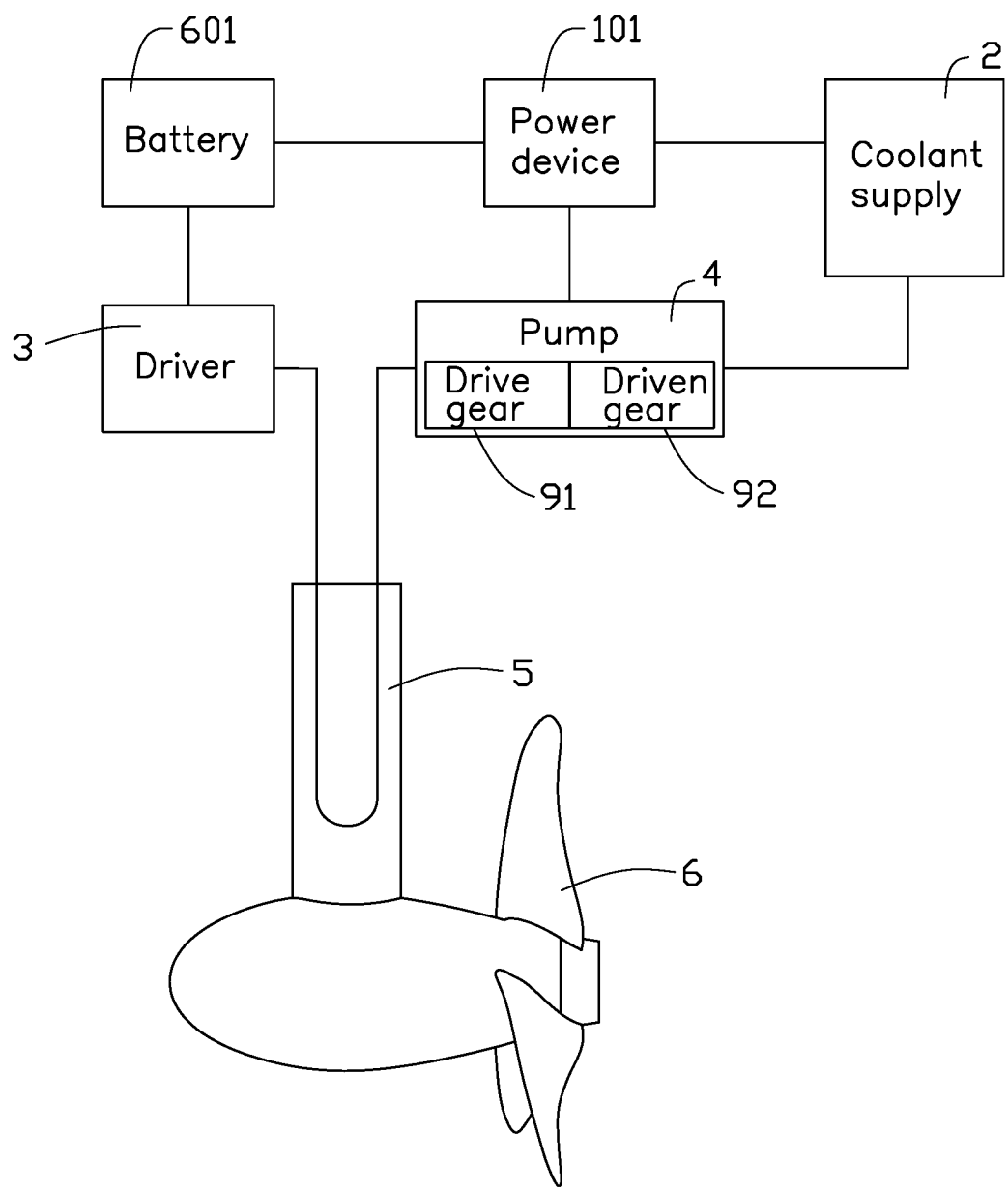
FIG. 4 is a schematic view of a second embodiment of a ship propulsion apparatus.

Referring to FIG. 4, a ship propulsion apparatus of a second embodiment is provided. The difference between the ship propulsion apparatus of the second embodiment and the ship propulsion apparatus of the first embodiment is that the pump of the first embodiment includes a pump driver, the pump of the second embodiment is a pump 4 driven by the power device 101.

In an alternative embodiment, the arrangement of each component and the communication relationship between each component is not limited to this embodiment, for example the power device 101 and the coolant supply 2 may be indirectly coupled with each other, other components needing to be cooled, for example a circuit board, a driver, a battery, or the like, are arranged between the power device 101 and the coolant supply 2.

In an alternative embodiment, the manner of exchanging the heat is not limited to part immersion of the fluid circuit in the water of the lake or the sea, for example the manner of exchanging the heat is complete immersion of the fluid circuit in such water.

In an alternative embodiment, the manner of exchanging the heat is not limited to part immersion of the fluid circuit in the water, for example the manner of exchanging the heat is to arrange one or more fans outside the fluid circuit, and the coolant in the fluid circuit is cooled via an air-cooling manner. The position of the one or more fans is not limited to the specific position, for example the one or more fans are arranged on a top of the fluid circuit. In the embodiment, a structure of arranging a passage in the supporting rod is omitted when the manner of exchanging the heat is to employ the one or more fans to cool the fluid circuit.

Figure 5:
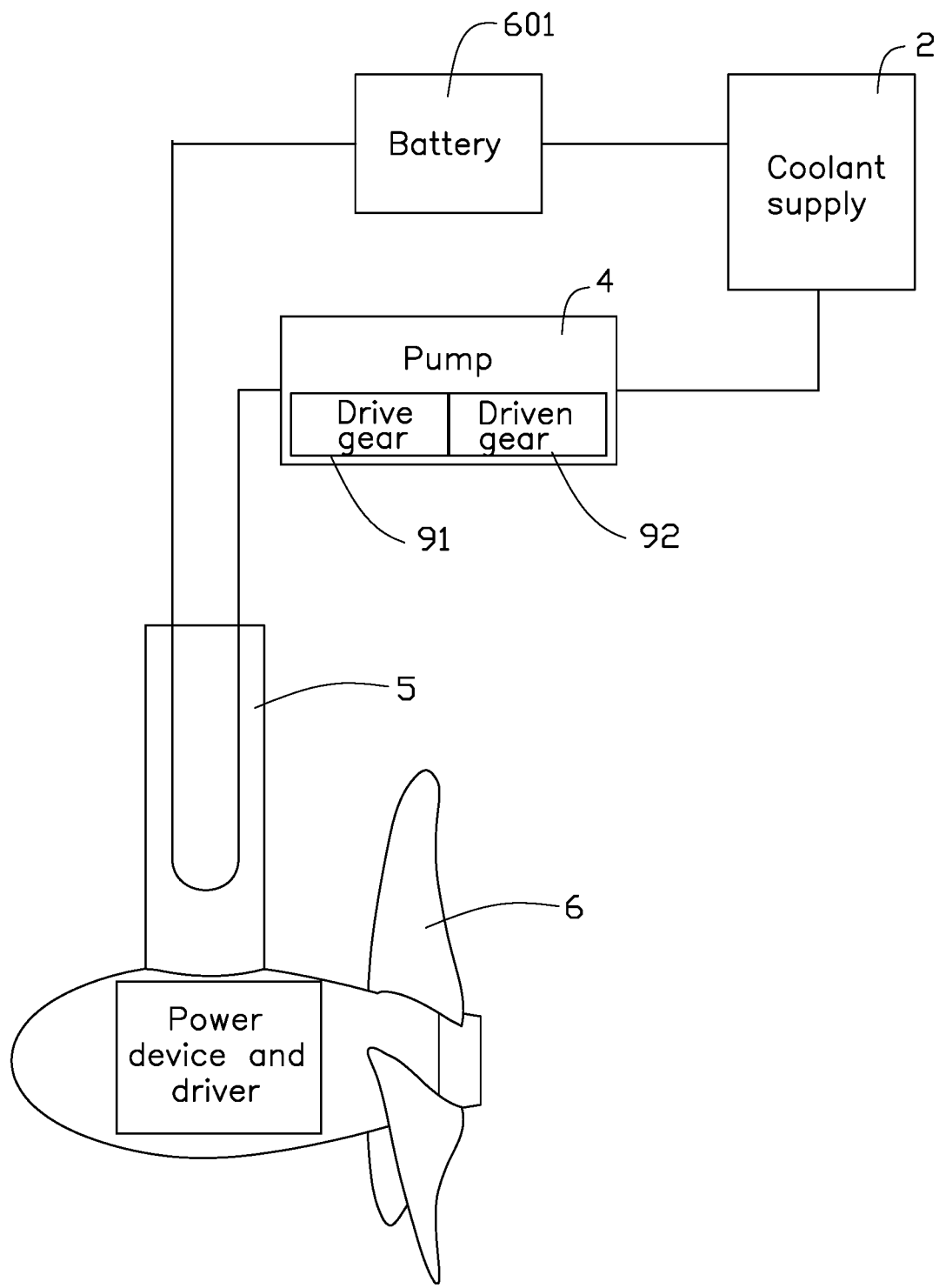
FIG. 5 is a schematic view of a third embodiment of a ship propulsion apparatus.

In an alternative embodiment, the power device and the driver are arranged in an end of the ship propulsion apparatus adjacent to a propeller. The power device and the driver are configured to drive the propeller and/or the pump. Thus the coolant in the fluid circuit cannot circulate through the power device and the driver. Referring to FIG. 5, a power device and a driver of a ship propulsion apparatus of a third embodiment are arranged adjacent to the propeller 6, and the coolant in the fluid circuit cannot circulate through the power device and the driver. In the embodiment, the power device is an electric motor.

Figure 6:
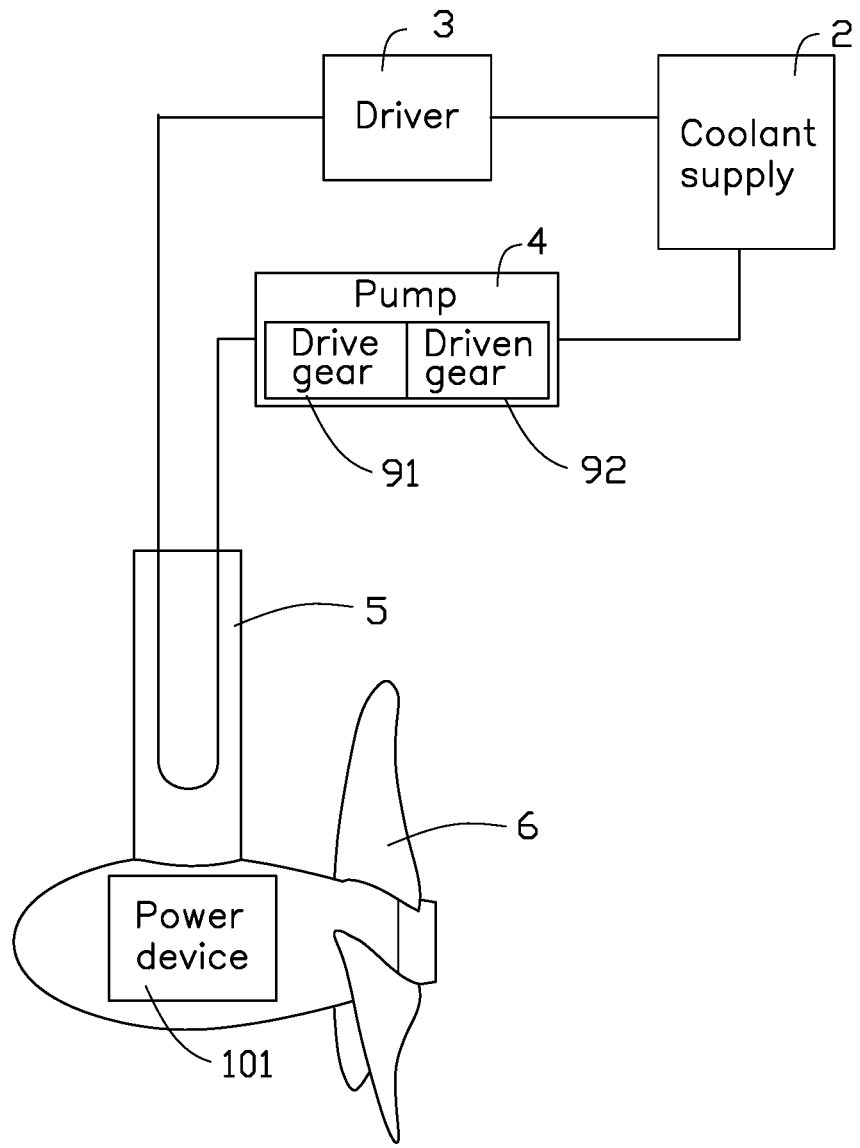
FIG. 6 is a schematic view of a fourth embodiment of a ship propulsion apparatus.

In an alternative embodiment, the power device is arranged in an end of the ship propulsion apparatus adjacent to the propeller 6. The power device is configured to drive the propeller 6 and/or the pump. Thus, the coolant in the fluid circuit does not circulate through the power device. Referring to FIG. 6, a power device of a ship propulsion apparatus of a fourth embodiment is arranged adjacent to the propeller 6, and the coolant in the fluid circuit does not circulate through the power device and the battery no matter the ship propulsion apparatus includes the battery or not. In the embodiment, the ship propulsion apparatus includes the battery, but the coolant in the fluid circuit does not circulate through the battery.

Figure 7:
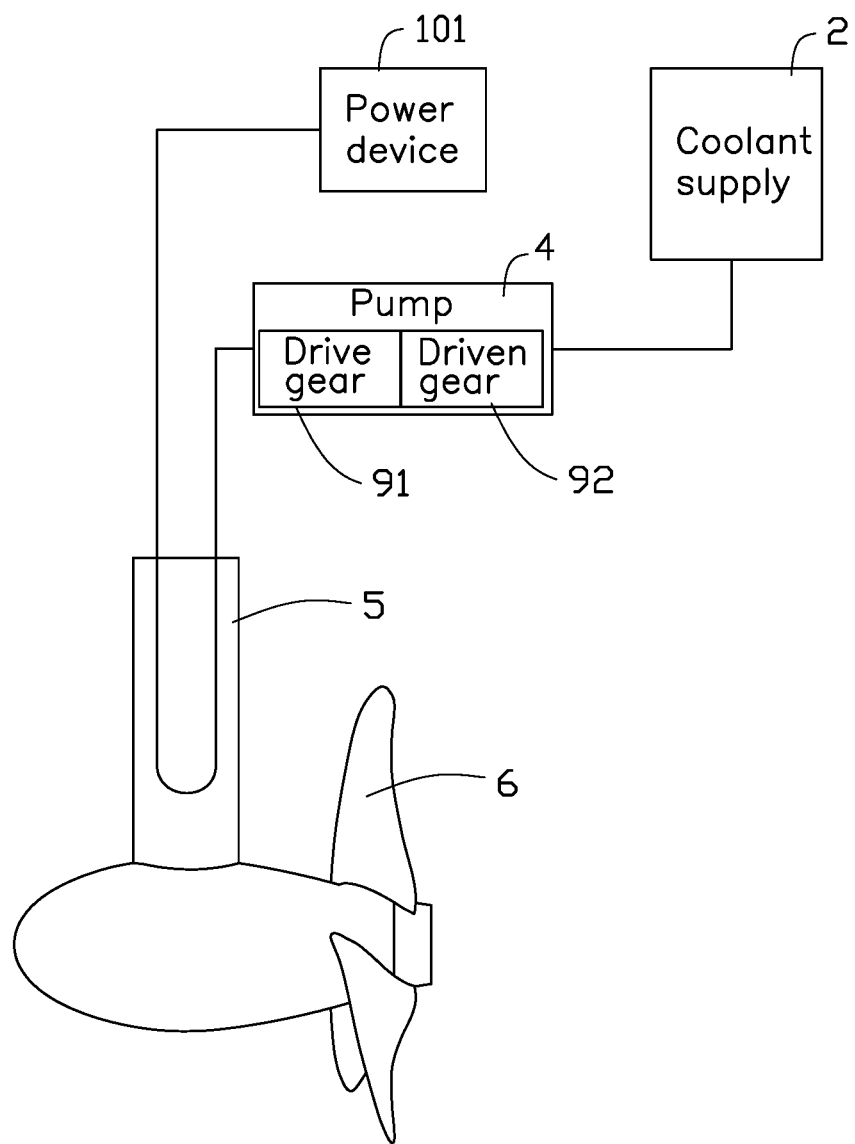
FIG. 7 is a schematic view of a fifth embodiment of a ship propulsion apparatus.

In an alternative embodiment, the coolant in the fluid circuit does not circulate through the driver. Referring to FIG. 7, a coolant in the fluid circuit of a ship propulsion apparatus of a fifth embodiment circulates through the power device 101, the supporting rod 5, the pump 4, and the coolant supply 2, but does not circulate through the driver no matter the ship propulsion apparatus includes the driver or not. In the embodiment, the power device 101 is an engine, and the ship propulsion apparatus does not include a driver.

In other embodiments, the ship propulsion apparatus 1 is not limited to being a ship propulsion apparatus with a propeller 6. Namely, the aforementioned structure of the fluid circuit is applied in the ship propulsion apparatus 1 with different manners of propulsion, for example, a jet propulsion apparatus.

Figure 8:
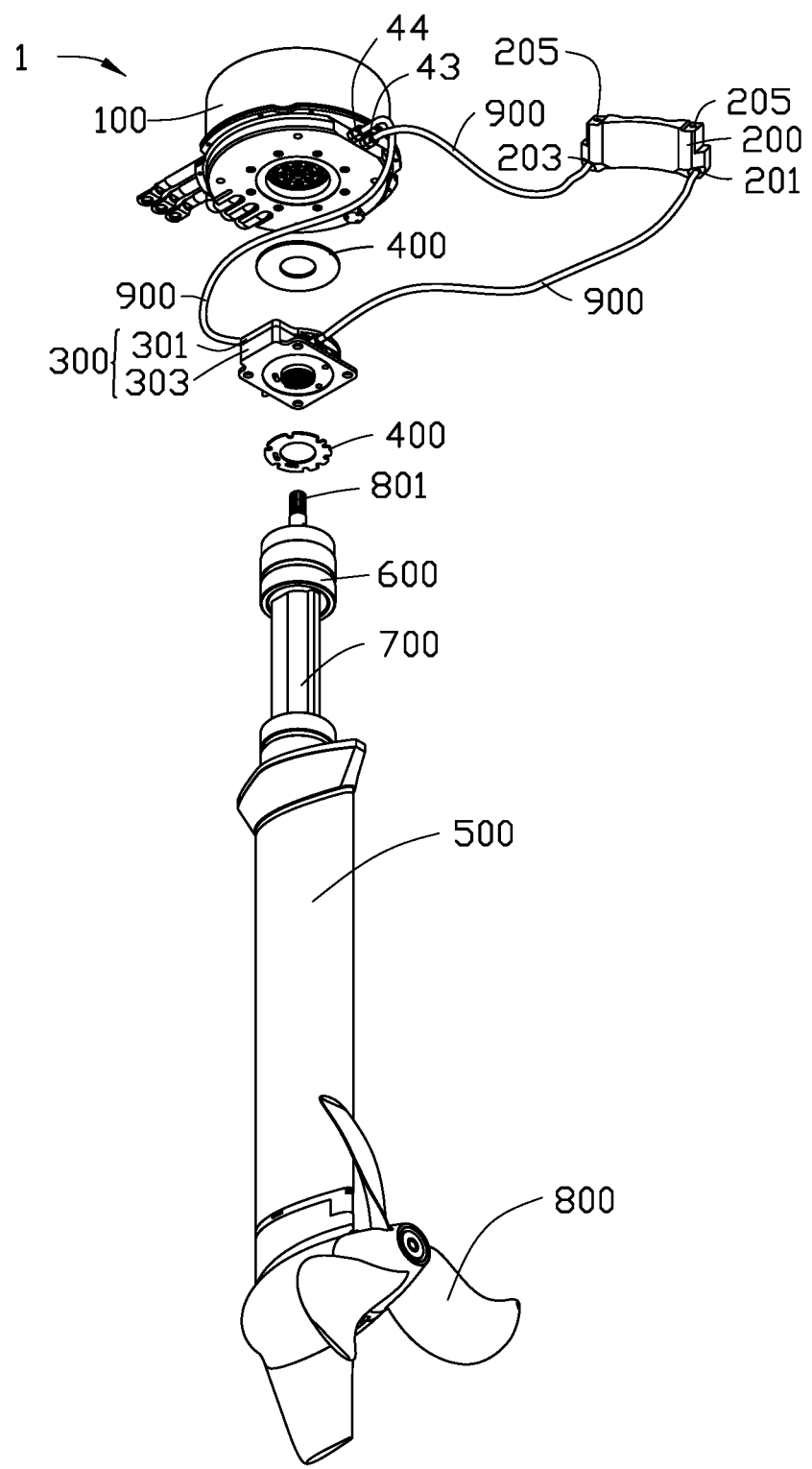
FIG. 8 is an exploded view of a sixth embodiment of a ship propulsion apparatus.
Figure 9:
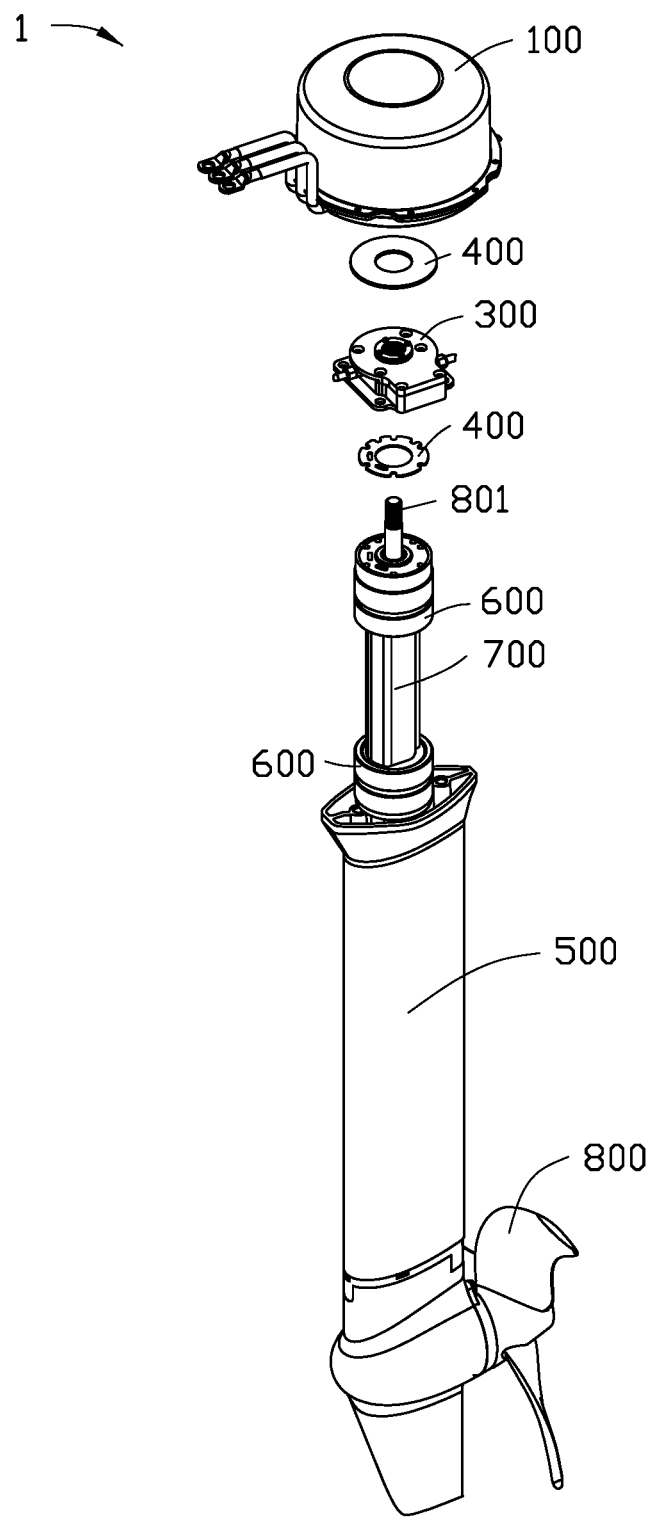
FIG. 9 is similar to FIG. 8, but viewed from another perspective.
Figure 10:
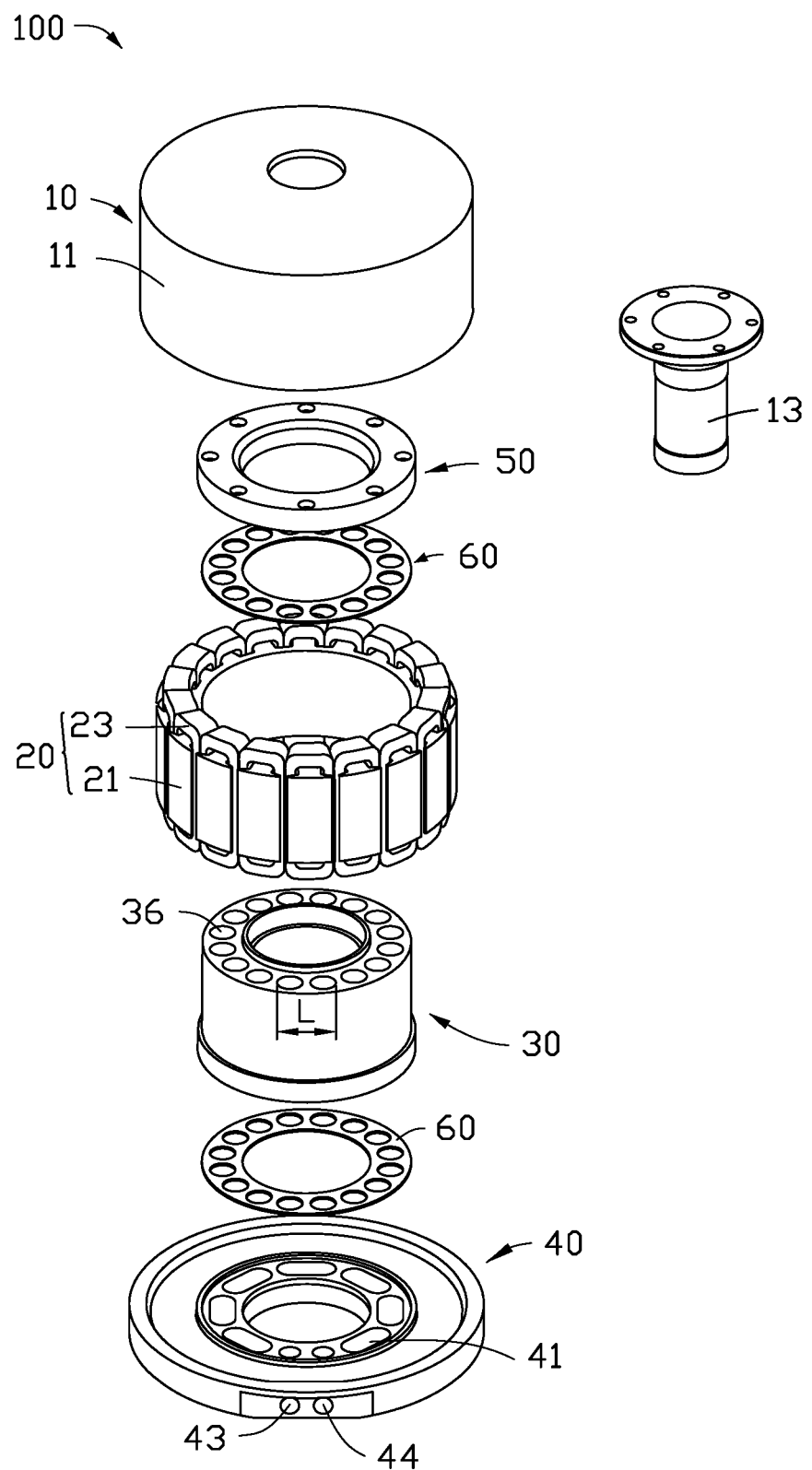
FIG. 10 is an exploded view of a power device of the ship propulsion apparatus of FIG. 8.
Figure 11:
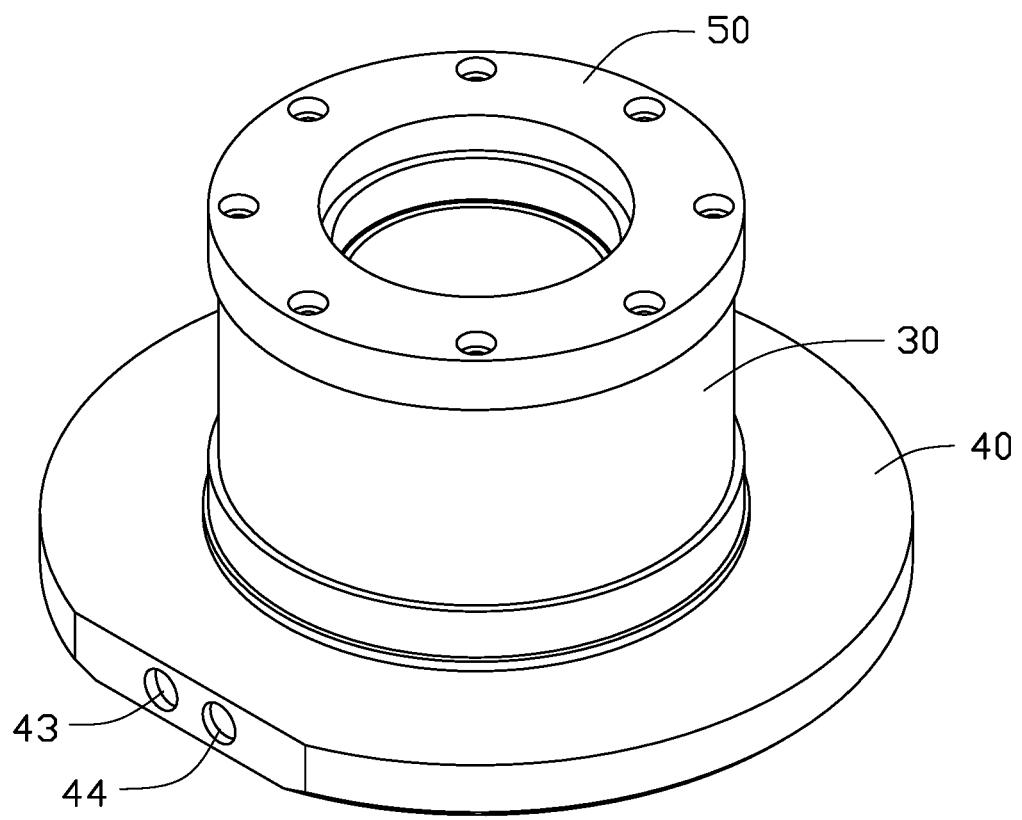
FIG. 11 is a view of a heat sink, a first end cover, and a second end cover of the power device assembled together.
Figure 12:
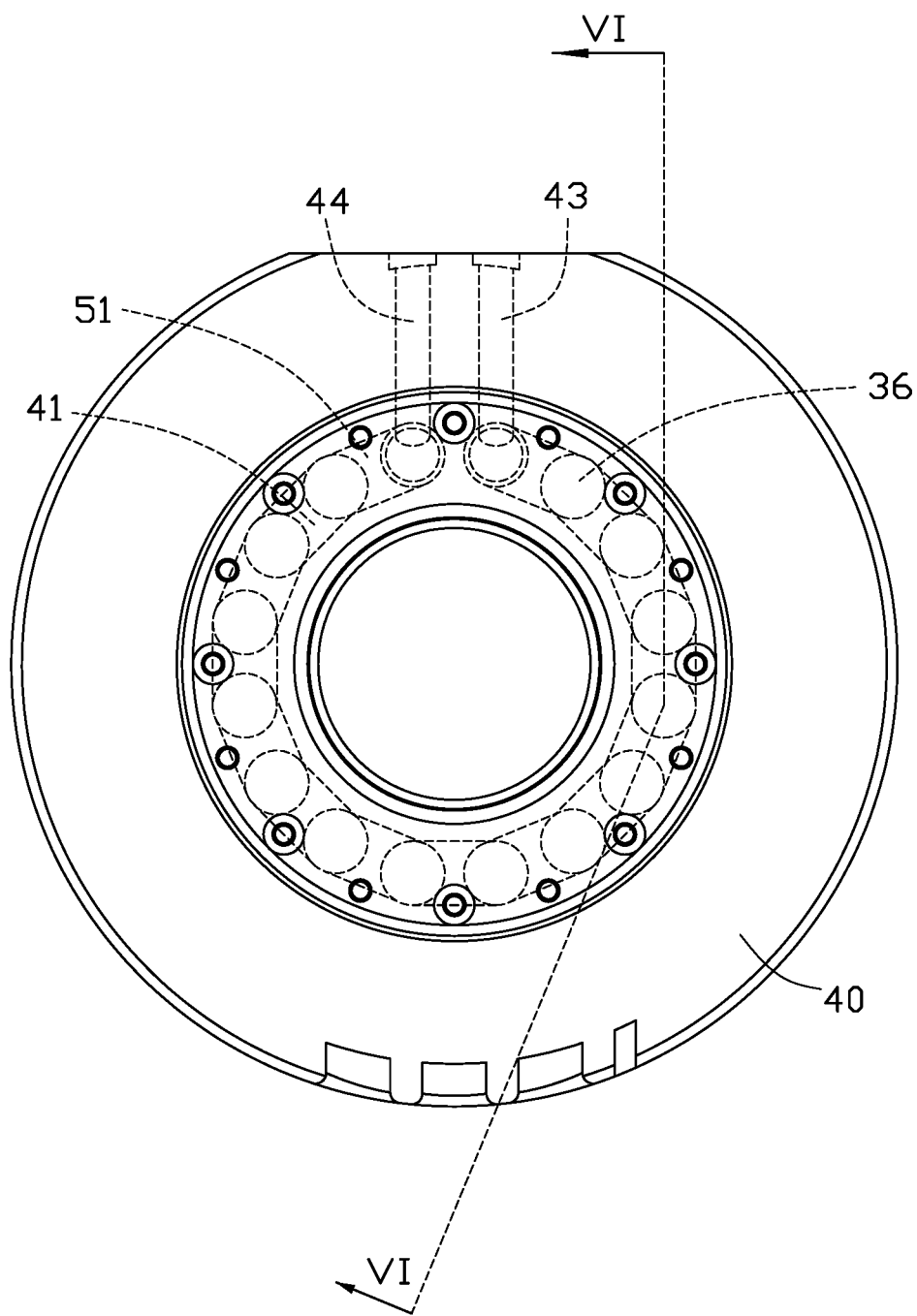
FIG. 12 is a bottom view of the power device of FIG. 11.
Figure 13:
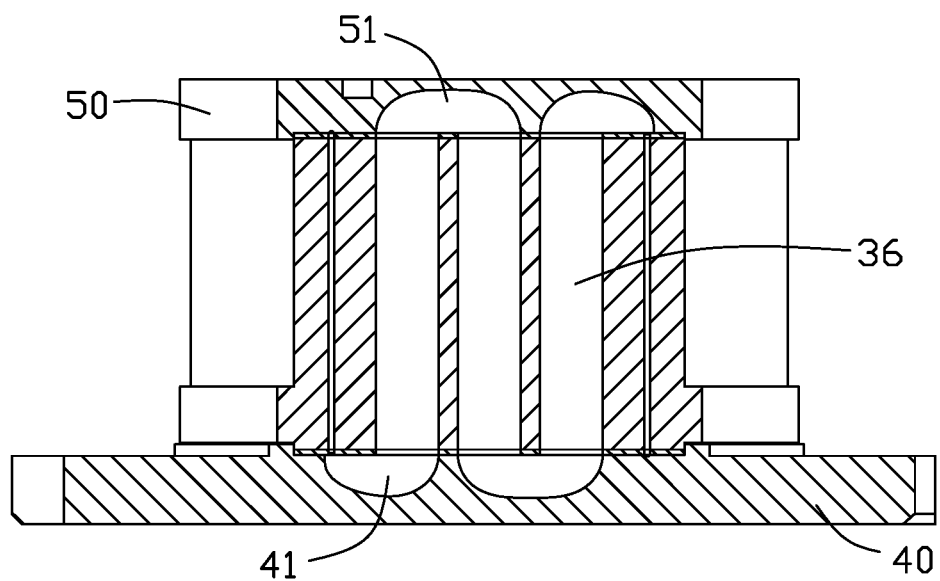
FIG. 13 is a cross-sectional view along line VI-VI of FIG. 11.
Figure 14:
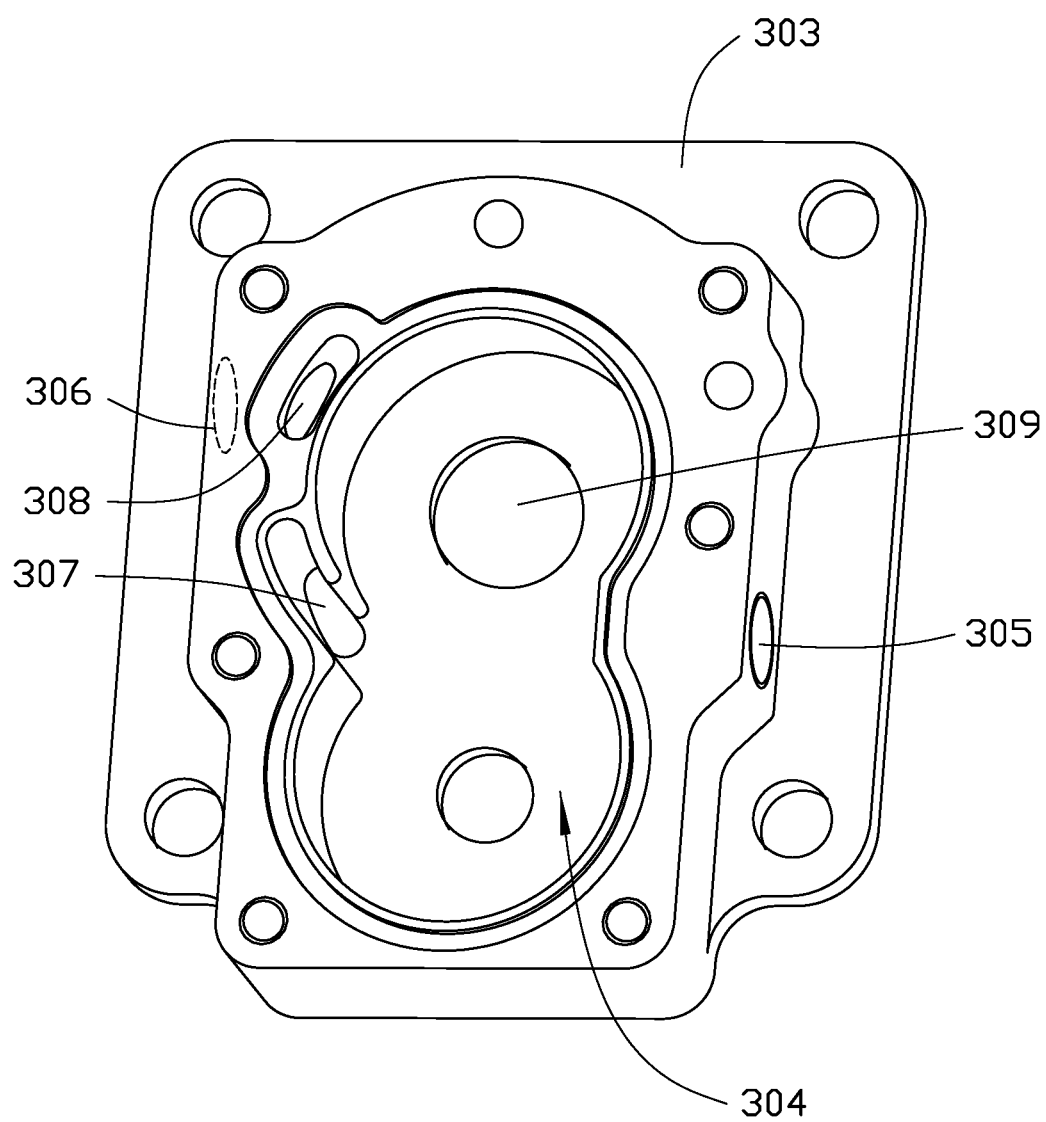
FIG. 14 is a schematic view of a second end cover of a pump of the ship propulsion apparatus of FIG. 8.
Figure 15:
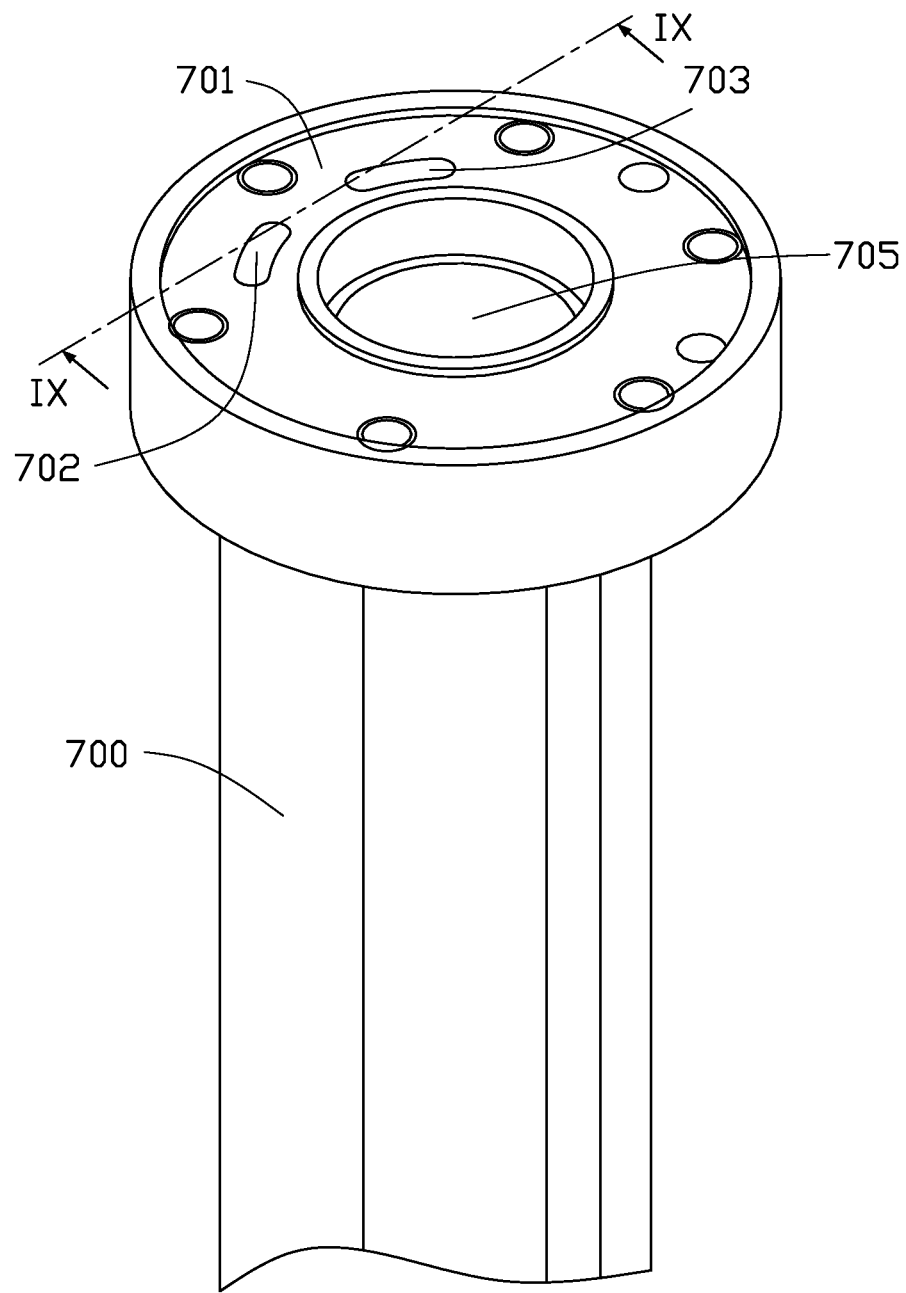
FIG. 15 is an enlarged view of a portion of a bushing of the ship propulsion apparatus of FIG. 8.
Figure 16:
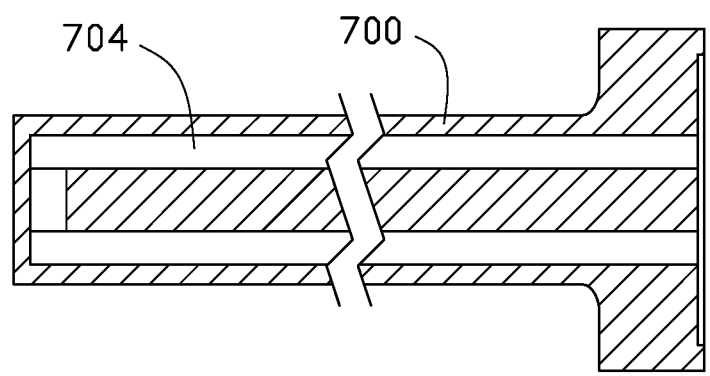
FIG. 16 is a cross-sectional view along line IX-IX of FIG. 15.

Referring to FIG. 8 and FIG. 9, a sixth embodiment can provide a ship propulsion apparatus 1. The ship propulsion apparatus 1 includes a power device 100, a coolant supply 200, a pump 300, one or more sealing members 400, a housing 500, one or more bushings 600, a supporting rod 700, a propeller 800, and a number of water pipes 900. The coolant supply 200 is arranged at one side of the power device 100. The coolant supply 200 is configured to provide coolant for cooling the ship propulsion apparatus 1. The pump 300 is arranged below the power device 100. The coolant supply 200 communicates with the pump 300 by a water pipe 900, and the coolant supply 200 communicates with the power device 100 via another water pipe 900. Thus, the coolant circulates among the power device 100, the coolant supply 200, and the pump 300. The one or more sealing members 400 are arranged between the power device 100 and the pump 300, and/or between the pump 300 and the supporting rod 700. The one or more sealing members 400 are to prevent a leak of the coolant. The supporting rod 700 is below the pump 300, and communicates with the pump 300, thus the coolant circulates in the pump 300 and the supporting rod 700. The one or more bushings 600 are sleeved on the supporting rod 700. The one or more bushings 600 and the supporting rod 700 are housed in the housing 500 which supports the power device 100 and the pump 300. The propeller 800 is below the housing 500 and driven by the power device 100 to rotate. In the embodiment, the ship propulsion apparatus 1 is an electric outboard motor, the power device 100 is an electric motor, and the coolant supply 200 is a water tank.

Referring to FIG. 10 to FIG. 17, the power device 100 of the embodiment includes a rotor 10, a stator 20, a heat sink 30, a first power device end cover 40, a second power device end cover 50, and two sealing pads 60. In the embodiment, the power device 100 is an external rotor motor. The rotor 10 includes a casing 11, a number of magnets (not shown) received in the casing 11, and a rotary shaft 13. The rotary shaft 13 passes through an end wall of the casing 11 and is inserted into the heat sink 30. A central axis of the rotary shaft 13 coincides with a central axis of the power device 100. The stator 20 is received in the rotor 10, and the stator 20 is sleeved on the heat sink 30. The stator 20 includes a magnetic core 21 and a number of coils 23 winding around the magnetic core 21. The coils 23 generate magnetic field at an effect of an electric power, and the rotor 10 interacts with the magnetic field generated by the coils 23, causing the rotor 10 to rotate in response to the magnetic field. The first power device end cover 40 and the second power device end cover 50 are arranged at two ends of the heat sink 30. One sealing pad 60 of the two sealing pads 60 is arranged between the heat sink 30 and the first power device end cover 40, and the other sealing pad 60 of the two sealing pads 60 is arranged between the heat sink 30 and the second power device end cover 50.

The heat sink 30 is substantially cylindrical. The heat sink 30 is received in the magnetic core 21. The heat sink 30 defines a number of power device coolant passages 36 extending through two ends of the heat sink 30 and extending along a direction parallel with a central axis of the heat sink 30. The first power device end cover 40 defines a number of first communication slots 41 at an end surface adjacent to the heat sink 30. The first communication slots 41 have concavities. The first power device end cover 40 further defines a power device fluid inlet 43 and a power device fluid outlet 44. The power device fluid inlet 43 and the power device fluid outlet 44 are substantially in "⌊" shape. The second power device end cover 50 defines a number of second communication slots 51 at an end surface adjacent to the heat sink 30. The shape of the second communication slots 51 is similar to the shape of the first communication slots 41, and also has concavities. One end of the two adjacent power device coolant passages 36 aligns with the power device fluid inlet 43 and the power device fluid outlet 44, the other end of the two adjacent power device coolant passages 36 aligns and communicates with the two adjacent second communication slots 51 of the second power device end cover 50. The power device coolant passages 36 excepting the two power device coolant passages 36 aligning with the power device fluid inlet 43 and the power device fluid outlet 44, one end of each aligns and communicates with one first communication slot 41 of the first power device end cover 40, the other end of each aligns and communicates with one second communication slot 51 of the second power device end cover 50. Thus, the power device coolant passages 36, the first communication slots 41, and the second communication slots 51 cooperatively form a passage of coolant capable of introducing the coolant into the power device fluid inlet 43 and of being taking the coolant out from the power device fluid outlet 44.

The shape of the coolant supply 200 is not limited. In the embodiment, the coolant supply 200 is cuboid, the interior of the coolant supply 200 is configured to receive the coolant. The coolant supply 200 further defines a coolant supply fluid inlet 201, a coolant supply fluid outlet 203, and an injection hole 205 for injecting the coolant. The coolant supply fluid inlet 201 and the coolant supply fluid outlet 203 are coupled to the one or more water pipes 900. Thus, the coolant circulates into the coolant supply 200 via the one or more water pipes 900. The coolant supply 200 is fixed to a power device casing, is supported at a top of the power device 100, or is installed on other components.

Further referring to FIG. 8, the pump 300 includes a first pump end cover 301, a second pump end cover 303 fixed to the first pump end cover 301, and a drive gear (not shown) and a driven gear (not shown) received between the first pump end cover 301 and the second pump end cover 303. The drive gear and the driven gear of the sixth embodiment are same as the drive gear and the driven gear of the first embodiment. The second pump end cover 303 defines a receiving groove 304. The first pump end cover 301 is stacked on the second pump end cover 303 and the first pump end cover 301 covers the receiving groove 304, to form a receiving room which receives the drive gear and the driven gear. In the embodiment, the pump 300 is a gear pump.

The second pump end cover 303 defines a first communication hole 305, a second communication hole 306, a third communication hole 307, and a fourth communication hole 308. In the embodiment, the first communication hole 305 and the second communication hole 306 is formed at opposite sidewalls of the pump 300, and the first communication hole 305 communicates with the receiving groove 304, thus the coolant circulates through the first communication hole 305 to enter into the receiving groove 304. The first communication hole 305 communicates with the coolant supply fluid inlet 201 or the coolant supply fluid outlet 203 via the one or more water pipes 900, and the second communication hole 306 communicates with the coolant supply fluid inlet 201 or the coolant supply fluid outlet 203 via the one or more water pipes 900. The power device fluid inlet 43 and the power device fluid outlet 44 excepting communicating with the second communication hole 306 communicates with the coolant supply fluid inlet 201 and the coolant supply fluid outlet 203 excepting communicating with the first communication hole 305 via the one or more water pipes 900.

The third communication hole 307 is formed as a concavity in a middle part of a sidewall of the second pump end surface forming the receiving groove 304, thus the third communication hole 307 is kept away from the drive gear and the driven gear. The third communication hole 307 is substantially arc-shaped and extends through opposite end surfaces of the second pump end cover 303. In other embodiments, the third communication hole 307 is other than a concavity in a middle part of the sidewall of the second pump end surface forming the receiving groove 304, providing only that the third communication hole 307 communicates with the receiving groove 304.

The fourth communication hole 308 also extends through end surfaces of the second pump end cover 303, and the fourth communication hole 308 communicates with the second communication hole 306. The fourth communication hole 308 is also substantially arc-shaped. In the embodiment, the fourth communication hole 308 is arranged to be adjacent to the second communication hole 306 and the third communication hole 307. Thus, the pump 300 forms two passageways. The two passageways are isolated from each other. One of the two passageways is formed through the drive gear and the driven gear, and another one of the two passageways is formed away from the drive gear and the driven gear. One of the two passageways is formed by the first communication hole 305, the receiving groove 304 receiving the drive gear and the driven gear, and the third communication hole 307. Another one of the two passageways is formed by the second communication hole 306, a passage in the pump 300 communicating between the second communication hole 306 and the fourth communication hole 308, and the fourth communication hole 308. In other embodiments, the passage communicating between the second communication hole 306 and the fourth communication hole 308 is other than in the pump 300, but independently arranged, for example, by employing a water pipe 900 arranged at a side of the pump 300.

The bottom of the receiving groove 304 defines a hole 309 for a transmission shaft 801 passing through. The drive gear is received in the receiving groove 304, and the central axis of the drive gear coincides with the central axis of the hole 309. The transmission shaft 801 is coupled to the power device 100, and extends through the drive gear and the pump 300, thus the transmission shaft 801 is driven by the power device 100 to bring the drive gear to rotate. The drive gear is engaged with the driven gear, and the drive gear drives the driven gear to rotate. When a rotating direction of the drive gear or the driven gear is different, the first communication hole 305 and the second communication hole 306 alternate to act as a pump fluid inlet and a pump fluid outlet. For example, when the drive gear rotates at a first direction, the first communication hole 305 is a fluid inlet, and the second communication hole 306 is a fluid outlet. When the drive gear rotates at a second direction (in reverse), the first communication is a fluid outlet, and the second communication hole 306 is a fluid inlet.

In an alternative embodiment, the third communication hole 307 and the fourth communication hole 308 only extend through an end surface of the second pump end cover 303 adjacent to the supporting rod 700. In an alternative embodiment, the first communication hole 305, the second communication hole 306, the third communication hole 307, and the fourth communication hole 308 are not limited to the positions described in this embodiment, and are formed at any suitable part of the pump 300. In an alternative embodiment, the first communication hole 305 and the second communication hole 306 are formed at the first pump end cover 301, providing only that the first communication hole 305 communicates with the receiving groove 304 and that the second communication hole 306 communicates with the fourth communication hole 308. In other embodiments, the pump 300 is not limited to being the gear wheel of this embodiment.

Figure 17:
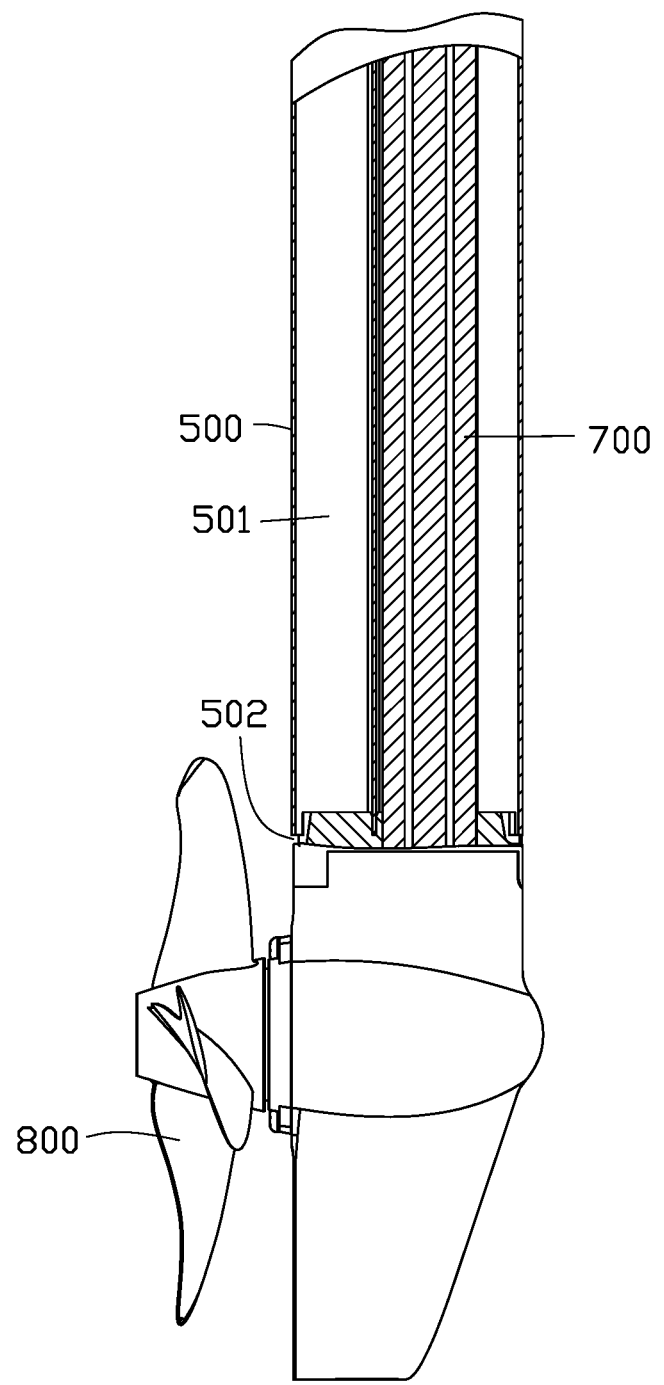
FIG. 17 is a cross-sectional view of part of structure of the ship propulsion apparatus of FIG. 8.

Further referring to FIG. 10 to FIG. 17, the housing 500 is substantially hollow and in shape of a rod. The housing 500 defines a receiving space 501 extending along a longitudinal axis of the housing 500. The receiving space 501 is configured to receive the bushings 600 and the supporting rod 700. The housing 500 defines a number of housing fluid inlets 502 (as shown in FIG. 17) at a part of the housing 500 adjacent to the propeller 800. The housing fluid inlets 502 communicate with the receiving space 501. The housing fluid inlets 502 are configured to provide an entrance for the water to inflow into the receiving space 501 of the housing 500 when one end of the housing 500 is immersed in the water of a lake or a sea.

In the embodiment, the number of the sealing members 400 is two, and each sealing member 400 is a sealing pad. One sealing member 400 is arranged between the power device 100 and the first pump end cover 301, and the other sealing member 400 is arranged between the second pump end cover 303 and the supporting rod 700. The sealing member 400 arranged between the pump 300 and the supporting rod 700 defines through holes corresponding to the third communication hole 307 and the fourth communication hole 308. In other embodiments, the sealing members 400 are not limited to being the sealing pads of the embodiment, for example, sealing greases or other substance can be used. The number of the sealing members 400 is not limited to two, but can be one, three, or more than three. When there is one sealing member 400, such sealing member 400 is arranged between the pump 300 and the supporting rod 700, or between the pump 300 and the power device 100. When there is three or more than three sealing members 400, the sealing members 400 are stacked between the pump 300 and the supporting rod 700, or between the pump 300 and the power device 100.

The supporting rod 700 is in shape of a rod. The supporting rod 700 defines a fifth communication hole 702 and a sixth communication hole 703 at an end surface adjacent to the pump 300. The fifth communication hole 702 and the sixth communication hole 703 extends along a longitudinal axis of the supporting rod 700 to connect and form a supporting rod coolant passage 704 at the other end away from the pump 300. The supporting rod coolant passage 704 is continuous with a larger curvature at the end of the supporting rod 700 away from the pump 300, thus a less drag occurred for the fluid circulation. The supporting rod 700 defines a supporting rod axle hole 705 extending through two ends of the supporting rod 700 along a central axis of the supporting rod 700. The supporting rod axle hole 705 and the supporting rod coolant passage 704 are spaced apart from each other. The transmission shaft 801 passes through the supporting rod axle hole 705. In the embodiment, the fifth communication hole 702 and the sixth communication hole 703 are arc-shaped. Thus, the cooling area of the supporting rod coolant passage 704 formed by inward extension increases. Namely, the cross-section of the supporting rod coolant passage 704 is arc-shaped. In an alternative embodiment, one or more fins are added on the supporting rod 700 to increase the dissipation of heat. In an alternative embodiment, the supporting rod coolant passage 704 is not limited to being U-shaped, for example, such passage 704 is a number of passages extending along a longitudinal axis of the supporting rod 700 and communicating with each other. In other embodiments, the fifth communication hole 702 and the sixth communication hole 703 are of any shape.

The supporting rod 700 extends in the receiving space 501 of the housing 500. In the embodiment, the number of the bushings 600 is two. One bushing 600 is sleeved on an end of the supporting rod 700 adjacent to the pump 300, and the other bushing 600 is sleeved on another end of the supporting rod 700 adjacent to the propeller 800. The two bushings 600 are also received in the housing 500. The supporting rod 700 is operatively mounted in the housing 500 via bushings 600. The fifth communication hole 702 of the supporting rod 700 aligns and communicates with the third communication hole 307 of the pump 300. The sixth communication hole 703 of the supporting rod 700 aligns and communicates with the fourth communication hole 308 of the pump 300. The third communication hole 307, the fourth communication hole 308, the fifth communication hole 702, and the sixth communication hole 703 are arc-shaped holes. The propeller 800 is arranged at an end of the housing 500 away from the pump 300, and is coupled to the transmission shaft 801, thus the propeller 800 is rotated by the power device 100.

Thus, the power device coolant passages 36, the first communication slots 41, the second communication slots 51, the coolant supply 200, the pump 300, the water pipes 900, and the supporting rod coolant passage 704 cooperatively form a fluid circuit. When the ship propulsion apparatus is working, the propeller 800 and an end of the housing 500 adjacent to the propeller 800 is fully immersed in water of a sea or a lake, and the housing fluid inlets are fully immersed in water of the sea or the lake. The water enters into the receiving space 501 of the housing 500 via the housing fluid inlets 502. Thus, an end of the supporting rod 700 adjacent to the propeller 800 is immersed in the water of the receiving space 501. Therefore, the coolant in the supporting rod coolant passage 704 is cooled, the cooled coolant in the supporting rod coolant passage 704 is pumped to the pump 300 and the power device 100 along the fluid circuit, to cool the pump 300 and the power device 100. Cooling cycles in a closed loop is thus be achieved.

In the embodiment, the fluid circuit is formed from the coolant supply to the power device to the pump to the supporting rod to the pump to the coolant supply, or the fluid circuit is formed from the coolant supply to the pump to the supporting rod to the pump to the power supply to the coolant supply.

In the embodiment, a closed fluid circulation loop is employed and a part of the supporting rod coolant passage 704 is immersed into the water to dissipate heat without drawing water from the sea or the lake to avoid contaminations and corrosions, the service life of the ship propulsion apparatus is prolonged.

In an alternative embodiment, the coolant supply 200 is omitted. The power device 100 communicates with the pump 300 via the water pipes 900, namely the first communication hole 305 communicates with one of the power device fluid inlet 43 and the power device fluid outlet 44 via the water pipes 900. The second communication hole 306 communicates with the other one of the power device fluid inlet 43 and the power device fluid outlet 44 via the water pipes 900. Before operating, coolant for cooling is injected into the fluid circuit. In other embodiments, the supporting rod 700 is not limited to the mounted by the bushings 600 of this embodiment.

In an alternative embodiment, the supporting rod coolant passage 704 is formed in the housing 500. At this time, the supporting rod 700 is omitted, namely, the housing 500 replaces the supporting rod 700 as a supporting structure. When the supporting rod coolant passage is formed in the housing 500, an end surface of the housing 500 defines communication holes to communicate with the pump 300. The housing 500 omits the housing fluid inlets. The cross-section of the supporting rod 700 or the housing 500 is teardrop shape, streamlined shape, or circular. In the embodiment, the fluid circuit is formed from the coolant supply to the power device to the pump to the housing to the pump to the coolant supply, or the fluid circuit is formed from the coolant supply to the pump to the housing to the pump to the power supply to the coolant supply.

In other embodiments, it's not limited to cool the power device 100 and the pump 300 only, other components generating heat are included. The coolant in the fluid circuit is rearranged to circulate through other components, other components are also cooled by employing such closed circulation cooling manner.

It should be noted that, the above embodiments are merely to illustrate the technical solutions of the present disclosure, it is not intended to be limited, although the preferred examples with reference to the present disclosure have been described in detail, the person skilled in the art should be understood that the present disclosure may be modification or equivalent replacement, without departing from the spirit and scope of the present disclosure.

What is claimed is:

1. A ship propulsion apparatus comprising:
a power device;
a pump;
a coolant supply; and
a fluid circuit formed in the ship propulsion apparatus, wherein the fluid circuit is configured to contain coolant to circulate through the pump and the coolant supply;
wherein the ship propulsion apparatus comprises a housing, the housing is sleeved on a supporting rod, the housing defines a plurality of housing fluid inlets configured for inflowing water to cool the coolant contained in the supporting rod.

2. The ship propulsion apparatus according to claim 1, wherein the fluid circuit is configured to contain the coolant to circulate through the power device.

3. The ship propulsion apparatus according to claim 1, wherein the power device drives the pump.

4. The ship propulsion apparatus according to claim 1, wherein the ship propulsion apparatus further comprises a propeller, the power device drives the propeller.

5. The ship propulsion apparatus according to claim 1, wherein the pump comprises a drive gear and a driven gear engaged with the drive gear, the fluid circuit is configured to contain the coolant to circulate through the drive gear and the driven gear.

6. The ship propulsion apparatus according to claim 1, wherein the ship propulsion apparatus further comprises the supporting rod, the fluid circuit is formed from the coolant supply to the power device to the pump to the supporting rod to the pump to the coolant supply, or the fluid circuit is formed from the coolant supply to the pump to the supporting rod to the pump to the power device to the coolant supply.

7. The ship propulsion apparatus according to claim 6, wherein the supporting rod defines a supporting rod coolant passage, the supporting rod coolant passage communicates with the pump in series, and the fluid circuit comprises the supporting rod coolant passage.

8. The ship propulsion apparatus according to claim 7, wherein the supporting rod coolant passage extends along a longitudinal axis of the supporting rod.

9. The ship propulsion apparatus according to claim 7, wherein an end surface of the supporting rod defines two communication holes, the supporting rod coolant passage extends from the two communication holes.

10. The ship propulsion apparatus according to claim 9, wherein the supporting rod further defines a supporting rod axle hole extending through the end surface of the supporting rod along a central axis of the supporting rod, the supporting rod axle hole and the supporting rod coolant passage are spaced apart from each other.

11. The ship propulsion apparatus according to claim 1, wherein the housing further defines a receiving space to receive the supporting rod, each of the housing fluid inlets communicates with the receiving space.

12. A ship propulsion apparatus comprising:
a power device;
a pump;
a coolant supply; and
a fluid circuit formed in the ship propulsion apparatus, wherein the fluid circuit is configured to contain coolant to circulate through the pump and the coolant supply;
wherein two passageways are formed in the pump, the two passageways are isolated from each other;
wherein one of the two passageways is formed through a drive gear and a driven gear, and another one of the two passageways is formed away from the drive gear and the driven gear.

13. The ship propulsion apparatus according to claim 12, wherein the pump defines a first communication hole, a second communication hole, a third communication hole, a fourth communication hole, and a receiving groove, the receiving groove is configured to receive the drive gear and the driven gear, one of the two passageways is formed by the first communication hole, the receiving groove and the third communication hole, and another one of the two passageways is formed by the second communication hole and the fourth communication hole.

14. A ship propulsion apparatus comprising:
a power device;
a pump;
a coolant supply; and
a fluid circuit formed in the ship propulsion apparatus, wherein the fluid circuit is configured to contain coolant to circulate through the pump and the coolant supply;

wherein the power device is an electric motor, the power device comprises a stator, a rotor, a heat sink, a first power device end cover, a second power device end cover, the heat sink is positioned in the stator, the first power device end cover and the second power device end cover are positioned at two ends of the heat sink, the heat sink defines a plurality of power device coolant passages.

15. The ship propulsion apparatus according to claim 14, wherein the first power device end cover defines a plurality of first communication slots each communicating with the power device coolant passages, the second power device end cover defines a plurality of second communication slots each communicating with the power device coolant passages, one of the first power device end cover and the second power device end cover defines a power device fluid inlet and a power device fluid outlet, or the first power device end cover defines a power device fluid inlet and the second power device end cover defines a power device fluid outlet, or vice versa, the power device fluid inlet and the power device fluid outlet each communicates with at least one of the power device coolant passages.

16. The ship propulsion apparatus according to claim 14, wherein the rotor comprises a magnetic core, and a plurality of coils winding around the magnetic core, the heat sink is arranged in the magnetic core.

17. The ship propulsion apparatus according to claim 12, wherein the ship propulsion apparatus further comprises a supporting rod, the fluid circuit is formed from the coolant supply to the power device to the pump to the supporting rod to the pump to the coolant supply, or the fluid circuit is formed from the coolant supply to the pump to the supporting rod to the pump to the power device to the coolant supply.

18. The ship propulsion apparatus according to claim 17, wherein the supporting rod defines a supporting rod coolant passage, the supporting rod coolant passage communicates with the pump in series, and the fluid circuit comprises the supporting rod coolant passage.

19. The ship propulsion apparatus according to claim 14, wherein the ship propulsion apparatus further comprises a supporting rod, the fluid circuit is formed from the coolant supply to the power device to the pump to the supporting rod to the pump to the coolant supply, or the fluid circuit is formed from the coolant supply to the pump to the supporting rod to the pump to the power device to the coolant supply.

20. The ship propulsion apparatus according to claim 19, wherein the supporting rod defines a supporting rod coolant passage, the supporting rod coolant passage communicates with the pump in series, and the fluid circuit comprises the supporting rod coolant passage.

* * * * *